US011556293B2

(12) United States Patent
Noda (10) Patent No.: US 11,556,293 B2
(45) Date of Patent: Jan. 17, 2023

(54) IMAGE PROCESSING DEVICE, IMAGE FORMING DEVICE AND RECORDING MEDIUM

(71) Applicant: KONICA MINOLTA, INC., Tokyo (JP)

(72) Inventor: Yoriko Noda, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 17/313,085

(22) Filed: May 6, 2021

(65) Prior Publication Data
US 2021/0349669 A1    Nov. 11, 2021

(30) Foreign Application Priority Data

May 7, 2020    (JP) .............................. JP2020-081662

(51) Int. Cl.
G06F 3/12    (2006.01)
G06K 15/02    (2006.01)

(52) U.S. Cl.
CPC .......... G06F 3/1242 (2013.01); G06F 3/1254 (2013.01); G06K 15/1867 (2013.01)

(58) Field of Classification Search
None
See application file for complete search history.

(56) References Cited

U.S. PATENT DOCUMENTS

| 2005/0036170 A1* | 2/2005 | Okuoka | H04N 1/32101 |
| | | | 358/1.16 |
| 2008/0196028 A1* | 8/2008 | Ito | G06F 3/1204 |
| | | | 718/100 |
| 2010/0033740 A1* | 2/2010 | Watanabe | H04N 1/3871 |
| | | | 358/1.9 |
| 2011/0217050 A1* | 9/2011 | Harada | G03G 15/00 |
| | | | 399/9 |
| 2017/0255850 A1* | 9/2017 | Furukawa | G06K 15/16 |
| 2018/0027146 A1* | 1/2018 | Kato | H04N 1/32117 |
| | | | 358/1.14 |

FOREIGN PATENT DOCUMENTS

| JP | 2002268468 | * | 9/2002 | ............. G03G 21/00 |
| JP | 2013086285 A | | 5/2013 | |
| JP | 2019091215 | * | 6/2019 | ............... G06F 3/12 |

* cited by examiner

Primary Examiner — Beniyam Menberu
(74) Attorney, Agent, or Firm — Buchanan Ingersoll & Rooney PC (57) ABSTRACT

An image processing device includes a job entry unit, a link setter, an association setter, an additional item setter, and a controller. The job entry unit enters jobs. The link setter associates the jobs entered by the job entry unit. The association setter associates one or more items common to the associated jobs. The additional item setter adds an additional item to one of the jobs, the additional item being for entering correction item information for correcting item information of a predetermined item among the one or more items associated by the association setter. The controller performs the jobs based on (i) item information of the one or more items associated by the association setter and (ii) additional item information of the additional item added by the additional item setter.

10 Claims, 6 Drawing Sheets

| | FILE NAME | USER NAME | PRINT FINISHED | LAST UPDATE TIME AND DATE | PAGE NUMBER |
|---|---|---|---|---|---|
| | 0010 | | | 06/22 10:10 | 1 |
| | 0009 | | FINISHED | 06/22 10:10 | 1 |
| | 0008 | | | 06/22 10:10 | 1 |
| | 0007 | | | 06/22 10:10 | 1 |
| | 0006 | | | 06/22 10:10 | 1 |
| | 0005 | | FINISHED | 06/22 10:10 | 1 |
| | 0004 | | | 06/22 10:10 | 1 |
| | 0003 | | | 06/22 10:10 | 1 |
| | 0002 | | | 06/22 10:10 | 1 |
| | 0001 | | | 06/22 10:10 | 1 |

MACHINE STATUS | JOB LIST | READ HDD | COPY | SCAN

SELECT JOB FROM LIST AND OPERATE JOB
NUMBER OF JOBS TEMPORARILY SAVED 010

2011/06/22 10:12
DOCUMENT COUNTER 0 AVAILABLE SPACE IN MEMORY 98.000%
NUMBER OF RESERVED JOBS 0 AVAILABLE SPACE IN FILE SYSTEM 96.600%

TEMPORARILY SAVED JOB | JOB OF RESERVED OUTPUT | OUTPUT HISTORY | TRANSMISSION HISTORY | UNOUTPUT HISTORY

JOB BEING SELECTED

TRAY: TRAY 1
SIZE: A4
TYPE: NORMAL PAPER
WEIGHT: 64-74g/m²
PRINT SIDE: ONE SIDE
COLOR: FULL COLOR
OUTPUT SETTING:

EJECTION TRAY:
CASE BINDER SUBTRAY
PRINT STATUS:
NOT PRINTED

RELEASE LOCK

DELETE JOB AFTER OUTPUT

MATERIAL | TURN IMAGE

SELECT MULTIPLE JOBS
SELECT ALL
DELETE
COPY
HDD SAVE
DISPLAY DETAILS
EDIT JOB
JOB TICKET
EDIT PAGE
LINK SETTING
CANCEL LINK
OUTPUT

READY TO RECEIVE PRINT DATA

FIG. 5

| MACHINE STATUS | JOB LIST | READ HDD | COPY | SCAN | | |
|---|---|---|---|---|---|---|
| TO EDIT WHOLE JOB, SELECT TICKET ITEM ON THE LEFT. | | | FILE NAME: 180330_154040_ | | EDIT JOB TICKET | EDIT IMAGE |
| TO EDIT EACH PAGE, SELECT TICKET ITEM ON THE RIGHT. | | | | | | ERROR CHECK |

JOB TICKET | TICKET OF EACH PAGE | SHEET No. 1/4

BASIC SETTING — DISPLAY ALL

| FILE NAME | 1183 |
|---|---|
| NUMBER OF COPIES | 0001 |

OUTPUT SETTING

| DIRECTION OF DOUBLE-SIDED BINDING | LATERAL BINDING |
| SORT/GROUP | SORT |
| SIDE FOR EJECTION | FACE UP |
| EJECTION ORDER | FORWARD |
| PERMISSION FOR PILING | NO |
| FOLDED PRINT SIDE | |
| CASE BINDING | OFF |
| EJECT UNNECESSARY INDEX PAPER | EJECT |
| RING BINDING | OFF |
| SEPARATION OUTPUT | OFF |
| CUT BOTH EDGES | OFF |
| CREASE | OFF |
| EXTERNAL FINISHER | NO |
| AUTOMATIC IMAGE CORRECTION | OFF |

ADDITIONAL SETTING

| BOOKLET | OFF |
| PERFECT BINDING | OFF |

1/3

PAPER SETTING

| PROFILE No. | — |
| PAPER SIZE | A4 |
| PAPER TRAY | AUTO |
| PAPER TYPE | NORMAL PAPER |
| WEIGHT | 106–135g/m² |
| COLOR PAPER | WHITE |
| HOLE | NO HOLE |

1/1

PRINT SIDE

| PRINT SIDE | ONE SIDE |

OUTPUT SETTING

| EJECTION TRAY | SADDLE STITCHING SUBTRAY |
| STAPLE | OFF |
| FOLD IN MIDDLE | OFF |
| FOLD IN THREE | OFF |
| SADDLE STITCHING | OFF |
| STAPLE END | OFF |
| FOLD | OFF |
| HOLE | OFF |

IMAGE ADJUSTMENT

| IMAGE SHIFT | OFF | — 212a |
| IMAGE SHIFT FOR ADDITIONAL PRINT | OFF | — 212b |
| MAGNIFICATION | OFF | — 212c |
| MAGNIFICATION FOR ADDITIONAL PRINT | OFF | — 212d |
| PROFILE | OFF |
| IMAGE SCREEN | SCREEN 1 /Dot190 |
| TEXT/GRAPHIC SCREEN | |
| GLOSS MODE | OFF |
| TONE CURVE ADJUSTMENT | OFF |

1/2

| OUTPUT SAMPLE | | CANCEL | SAVE AS NEW DATA | OVERWRITE |

FIG.6

IMAGE PROCESSING DEVICE, IMAGE FORMING DEVICE AND RECORDING MEDIUM

BACKGROUND

1. Technological Field

The present invention relates to an image processing device, an image forming device, and a recording medium.

2. Description of the Related Art

Conventionally, known decorative print includes two types of jobs, i.e., a sketch job of printing sketches and an additional print job of performing additional print.

In decorative print, paper is first placed on a feed tray of an image forming device, and black image print is performed for hot stamping. The paper on which the black image print is performed for the hot stamping is manually carried to a hot stamper. Hot stamping is performed on the paper. The hot-stamped paper is manually carried to the image forming device, and the paper is set again in the feed tray of the image forming device for additional printing.

The sketch jobs and the additional print jobs are independent of each other. When jobs are edited on a job edit screen, values common to both jobs are entered in some items. Examples of such items are image shift adjustment, magnification adjustment, a paper setting (paper type, weight, etc.), a setting of the number of copies, replacement of image pages, and the like.

For example, in a case where image shift adjustment and magnification adjustment are changed in the sketch job, the additional print job needs to be edited in the same manner. However, in the additional print job, fusing heat in hot stamping or the like may shrink the paper. In addition to image shift and magnification adjustment in the sketch job, it is necessary to further adjust image shift and magnification according to paper shrinking caused by fusing heat.

Image shift and magnification in response to paper shrinking due to fusing heat may vary depending on the environment such as paper type, temperature and humidity. They need to be fixed every time a job is printed.

For example, JP2013-86285A discloses link setting as a technique for easily managing jobs as associated jobs. The link setting associates a newly entered job with a stored job, or associates jobs stored in a job storage with each other while each associated job remains independent.

In a case where the link setting of the sketch job and the additional print job is performed according to the technology described in JP2013-86285A, it is possible to associate settings of image shift, magnification adjustment, etc. However, in the technique described in JP2013-86285A, each of the image shift and the magnification adjustment is an independent item. It does not solve a problem that correction for paper shrinking due to fusing heat in the additional print job must be calculated and corrected together with an image shift amount or magnification of the sketch job each time a job is printed.

SUMMARY

An object of the present invention is to facilitate adjustment of item information of jobs on which link setting is performed.

To achieve at least one of the abovementioned objects, according to an aspect of the present invention, an image processing device includes:

a job entry unit that enters jobs;

a link setter that associates the jobs entered by the job entry unit;

an association setter that associates one or more items common to the associated jobs;

an additional item setter that adds an additional item to one of the jobs, the additional item being for entering correction item information for correcting item information of a predetermined item among the one or more items associated by the association setter; and a controller that performs the jobs based on:

item information of the one or more items associated by the association setter; and additional item information of the additional item added by the additional item setter.

According to another aspect of the present invention, a non-transitory recording medium stores a computer readable program that makes a computer of an image processing device function as:

a job entry unit that enters jobs;

a link setter that associates the jobs entered by the job entry unit;

an association setter that associates one or more items common to the associated jobs;

an additional item setter that adds an additional item to one of the jobs, the additional item being for entering correction item information for correcting item information of a predetermined item among the one or more items associated by the association setter; and a controller that performs the jobs based on:

item information of the one or more items associated by the association setter; and additional item information of the additional item added by the additional item setter.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Configuration of Image Forming Device

Figure 1:
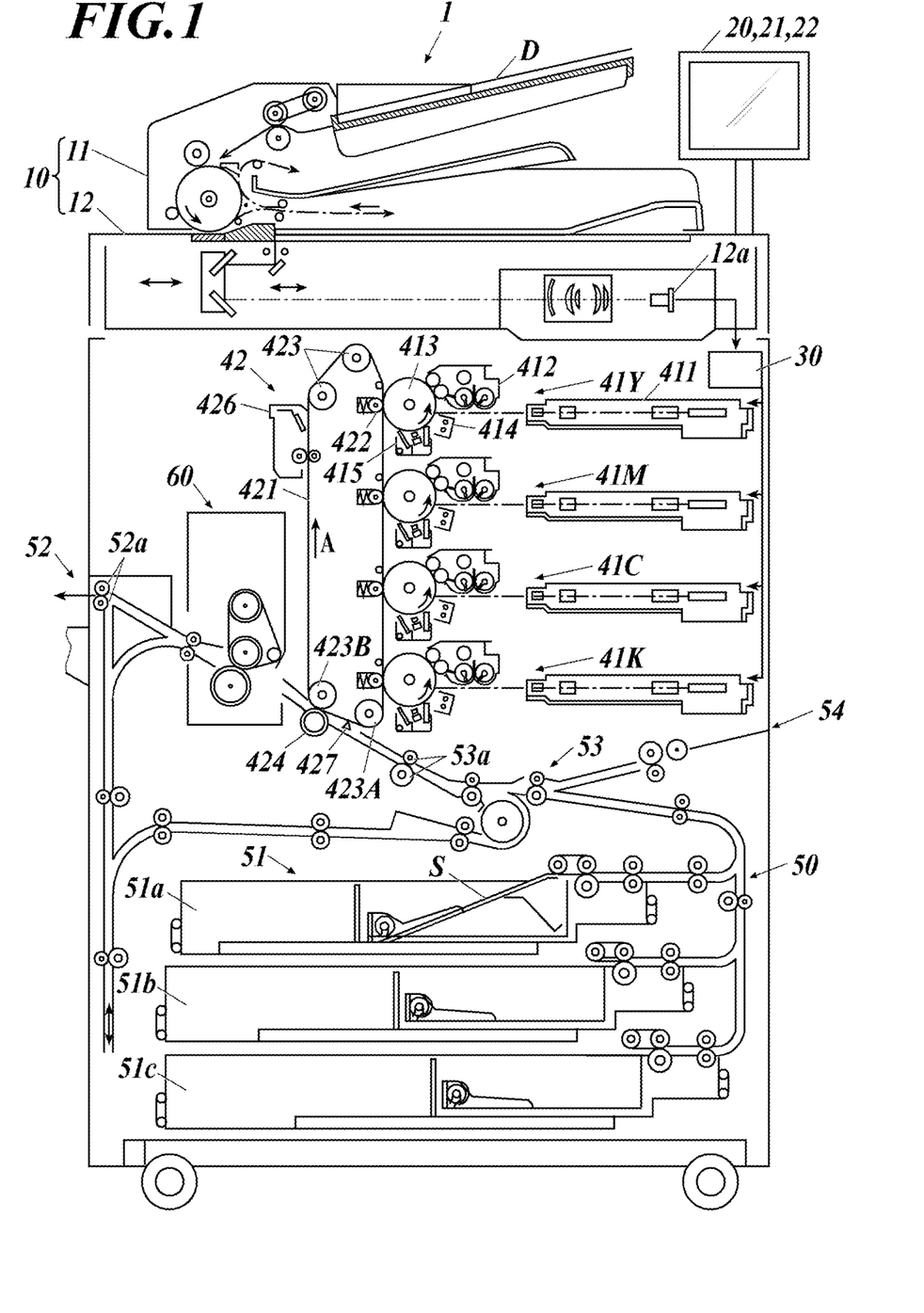
FIG. 1 schematically shows an overall configuration of an image forming device according to the embodiment.
Figure 2:
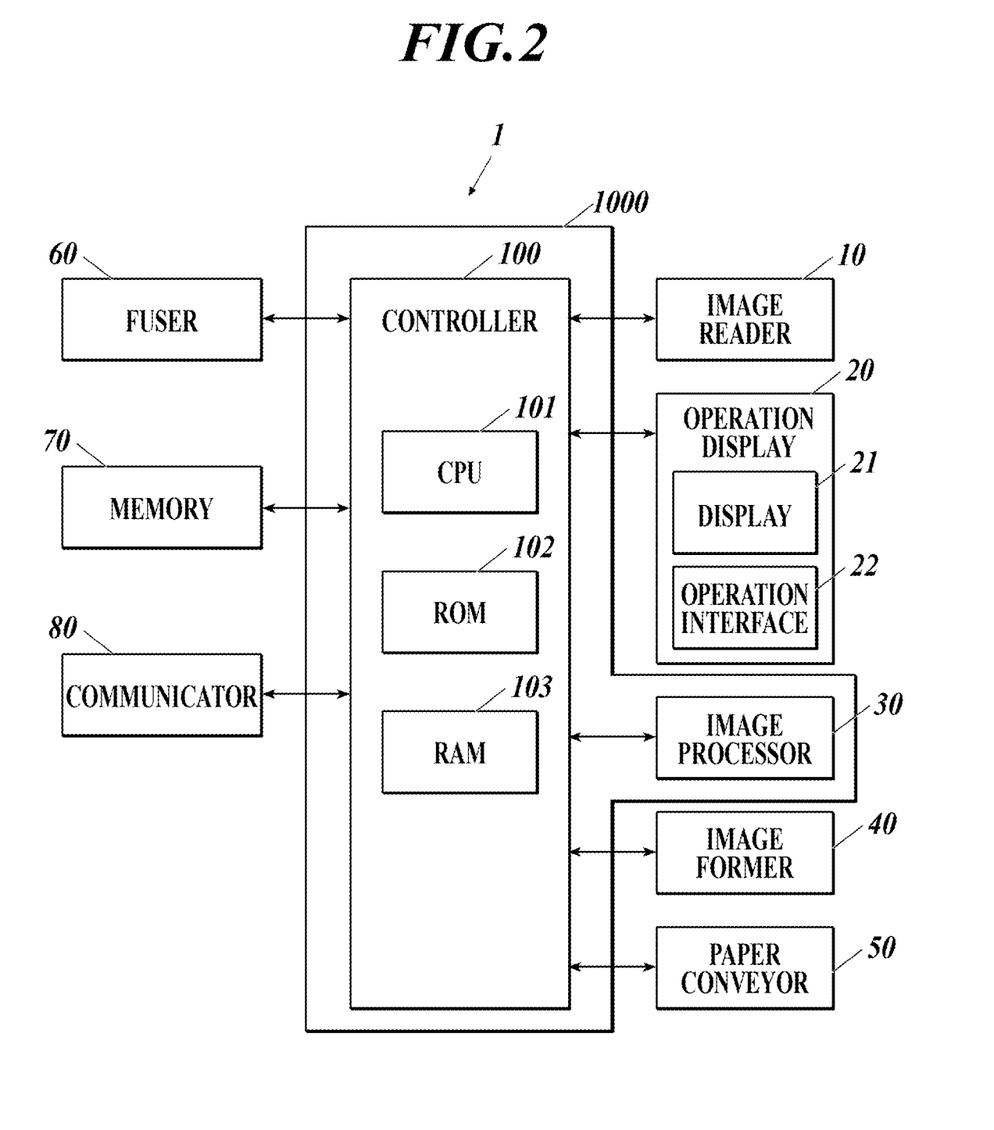
FIG. 2 is a block diagram showing a functional configuration of the image forming device.

FIG. 1 schematically shows an overall configuration of an image forming device 1 according to an embodiment. FIG.

2 is a block diagram showing a main functional configuration of the image forming device 1 according to the embodiment.

The image forming device 1 shown in FIGS. 1 and 2 is a color image forming device in an intermediate transfer method using electronic photography process technology. The image forming device 1 transfers (primary transfer) color toner images of Y (yellow), M (magenta), C (cyan), and K (black) formed on photosensitive drums 413 to an intermediate transfer belt 421. The image forming device 1 piles the toner images of four colors on the intermediate transfer belt 421 and then transfers it to paper (secondary transfer). Thus, the image forming device 1 forms an image.

In the image forming device 1, the photosensitive drums 413 corresponding to the four colors YMCK are arranged in series in a travel direction of the intermediate transfer belt 421. A tandem method in which toner images of colors are sequentially transferred is adopted for the intermediate transfer belt 421.

As shown in FIG. 2, the image forming device 1 includes an image reader 10, an operation display 20, an image processor 30, an image former 40, a paper conveyor 50, a fuser 60, memory 70, a communicator 80, and a controller 100.

The image reader 10 includes an automatic document feeder 11 called ADF, and a document image scanner 12.

The automatic document feeder 11 conveys a document D placed on a paper tray with a conveyance mechanism to send it to the document image scanner 12. The automatic document feeder 11 continuously reads a large number of images of the document D (including images on both sides) placed on the paper tray at once.

The document image scanner 12 optically scans a document conveyed from the automatic document feeder 11 onto the contact glass or scans a document placed on the contact glass. The document image scanner 12 focuses light reflected from the document on a light receiving surface of a CCD (charge coupled device) sensor 12a to form an image. Thus, the document image scanner 12 reads a document image. The image reader 10 generates input image data based on the reading result of the document image scanner 12. A predetermined image processing is applied to the input image data in the image processor 30.

The operation display 20 includes, for example, a liquid crystal display (LCD) with a touch panel, and functions as a display 21 and an operation interface 22. The display 21 displays various operation screens, image status, operation statuses of various functions, and the like according to display control signals inputted from the controller 100. The operation interface 22 includes various operation keys such as a numeric keypad and a start key. The operation interface 22 accepts various input operations by a user and outputs operation signals to the controller 100.

The image processor 30 includes a circuit for digital image processing according to an initial setting or a user setting for image data (input image data) of an entered job. For example, the image processor 30 corrects a tone based on tone correction data (tone correction table) under the control of the controller 100. In addition to the tone correction, the image processor 30 performs various correction processing such as color correction and shading correction, compression processing, and the like on input image data. The image former 40 is controlled based on image data on which the above processing is performed.

The image former 40 includes:
image forming units 41Y, 41M, 41C, 41K that form images with color toners of Y component, M component, C component, and K component based on the input image data on which image processing has been performed; and
an intermediate transfer unit 42.

The image forming units 41Y, 41M, 41C, 41K for Y component, M component, C component, and K component have the same configurations. For convenience of illustration and explanation, common components are shown with the same symbol. Y, M, C, or K are added to symbols for distinction. In FIG. 1, symbols are given only to components of the image forming unit 41Y for the Y component. Symbols are omitted for components of other image forming units 41M, 41C, 41K.

The image forming unit 41 includes an exposure device 411, a development unit 412, a photosensitive drum 413 (image carrier), a charger 414, and a drum cleaning device 415.

The photosensitive drum 413 is a negatively charged organic photo conductor (OPC). An undercoat layer (UCL), a charge generation layer (CGL), and a charge transport layer (CTL) are sequentially laminated on a circumference of, for example, an aluminum conductive cylinder (aluminum tube). The charge generation layer consists of an organic semiconductor in which a charge generating material (for example, phthalocyanine pigment) is dispersed in a resin binder (for example, polycarbonate). The charge generation layer generates a pair of positive and negative charges in response to exposure by the exposure device 411. The charge transport layer consists of a material in which a hole transport material (electron-donating nitrogen-containing compound) dispersed in a resin binder (for example, a polycarbonate resin). The charge transport layer transports the positive charge generated by the charge generation layer to a surface of the charge transport layer.

The controller 100 rotates the photosensitive drum 413 at a constant circumferential speed (for example, 665 mm/s) by controlling a drive current supplied to a drive motor (not shown) that rotates the photosensitive drum 413.

The charger 414 uniformly and negatively charges a surface of the photosensitive drum 413 having photoconductivity. The exposure device 411 is, for example, a semiconductor laser. The exposure device 411 irradiates the photosensitive drum 413 with laser beam corresponding to an image of each color component. A positive charge is generated in the charge generation layer of the photosensitive drum 413 and is transported to the surface of the charge transport layer. Thereby, the charge (negative charge) on the surface of the photosensitive drum 413 is neutralized. An electrostatic latent image of each color component is formed on the surface of the photosensitive drum 413 by potential difference from surroundings.

The development unit 412 is a development unit of the two-component development method in which a two-component developer including a toner and a carrier is used. The development unit 412 visualizes an electrostatic latent image by attaching toner of each color component to the surface of the photosensitive drum 413. Thus, the development unit 412 forms a toner image.

After the toner image is secondarily transferred to paper, the fuser 60 heats and applies pressure to the conveyed paper with a fusing nip. Thereby, the fuser 60 fixes the toner image on the paper.

The paper conveyor 50 includes a paper feeder 51, a paper delivery unit 52, and a conveyance route 53, and the like. Paper (standard paper, special paper) distinguished based on weight, size, etc. is classified into predetermined types and held in three feed tray units 51a to 51c that constitute the paper feeder 51. The conveyance route 53 includes pairs of conveyance rollers such as a pair of resist rollers 53a.

The top sheet of paper held in the feed tray units 51a to 51c is sent out one by one and conveyed to the image former 40 through the conveyance route 53. At this time, a resist roller portion provided with the pair of resist rollers 53a corrects inclination of the fed paper and adjusts conveyance time. Then, the image former 40 secondarily transfers a toner image of the intermediate transfer belt 421 to one side of paper at once. The fuser 60 performs a fixing step. The paper delivery unit 52 having ejection rollers 52a discharges paper on which an image is formed out of the machine.

Paper may be long paper or roll paper. In those cases, the paper is held in a feed device (not shown) connected to the image forming device 1. The paper held in the feed device is supplied to the image forming device 1 from the feed device via a paper entrance 54, and is sent to the conveyance route 53.

The memory 70 is, for example, nonvolatile semiconductor memory (so-called flash memory) or a hard disk drive. The memory 70 stores various data such as information of various settings for the image forming device 1.

The communicator 80 consists of a communication control card such as a LAN (local area network) card. The communicator 80 transmits and receives various data to and from external devices, such as a computer, connected to a communication network such as a LAN or WAN (wide area network).

Jobs printed by the image forming device 1 are entered by a user from the operation interface 22, or are received from external devices by the communicator 80. The operation interface 22 and the communicator 80 function as a job entry unit.

The controller 100 includes a CPU (central processing unit) 101, ROM (read only memory) 102, and RAM (random access memory) 103. The CPU 101 reads a program suitable for content of processing from the ROM 102, and develops it in the RAM 103. The CPU 101 cooperates with the developed program to comprehensively control operation of blocks of the image forming device 1 in FIG. 2.

For example, the controller 100 performs link setting processing and link cancel processing for jobs, which will be described later, to function as a link setter, an association setter, an additional item setter, and a controller.

The image processor 30 and the controller 100 function as an image processing device 1000.

The RAM 103 provides a work area in which various programs executed by the controller 100 and various data related to the programs are temporarily stored.

A job consists of image data and setting information of print condition for printing based on the image data. Printing by the image former 40 based on a job is expressed as "performing a job" or "printing a job".

Operation of Image Forming Device 1

Next, operation according to the embodiment will be described. According to the image forming device 1 of the embodiment, a link is set between two jobs displayed on a job list screen in the link setting processing for jobs described below. Some items common to the jobs are associated with each other. Additional items of the associated items may be added to an additional print job. In the embodiment, one of the two jobs on which the link setting is performed is a sketch job, and the other is the additional print job.

In the link cancel processing for jobs described below, additional items of the additional print job may be deleted.

The link setting or the association setting of the sketch job and the additional print job may be canceled.

Link Setting Processing for Jobs

Figure 3:
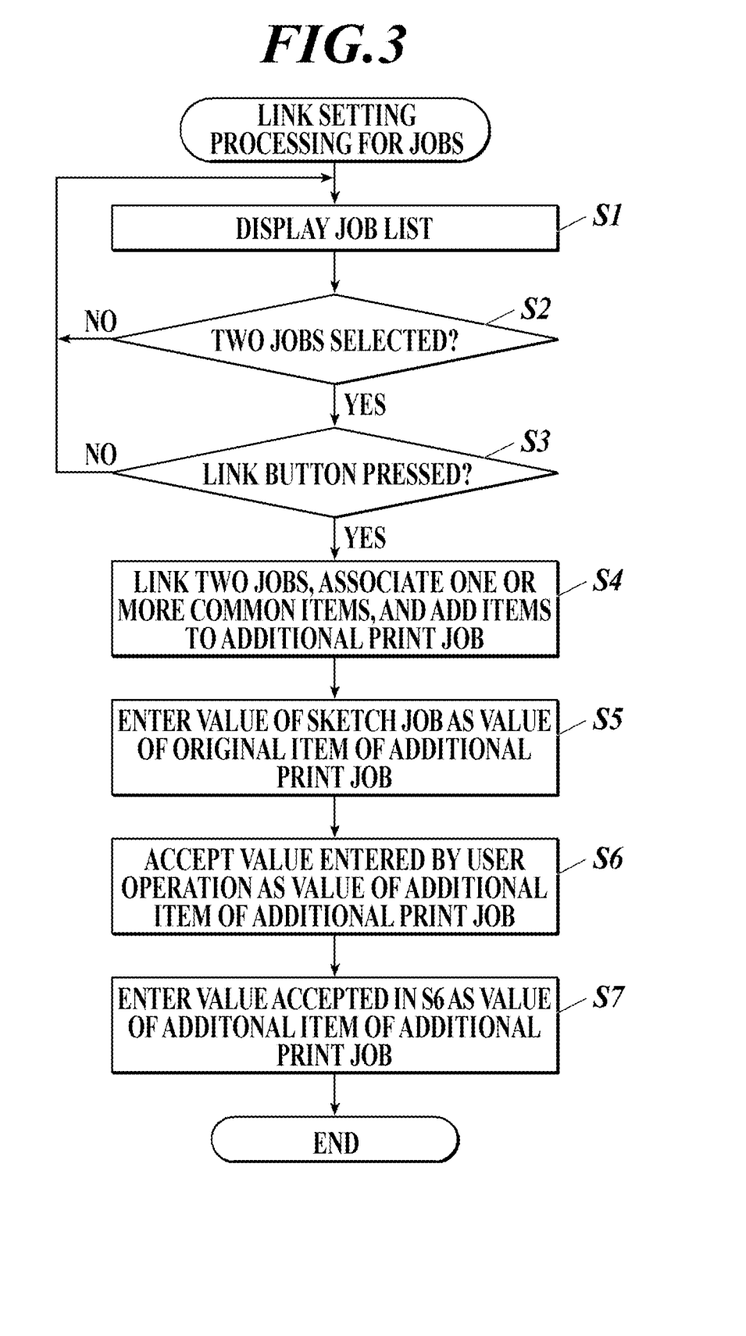
FIG. 3 is a flowchart showing link setting processing for jobs.

FIG. 3 shows a flowchart of link setting processing for jobs performed by the image forming device 1. The controller 100 cooperates with a program stored in the ROM 102 to perform the link setting processing for jobs in response to operation of the operation interface 22.

First, the controller 100 displays a job list screen 211 on the display 21 (Step S1). Jobs entered by the job entry unit are displayed on the job list screen 211.

Figure 4:
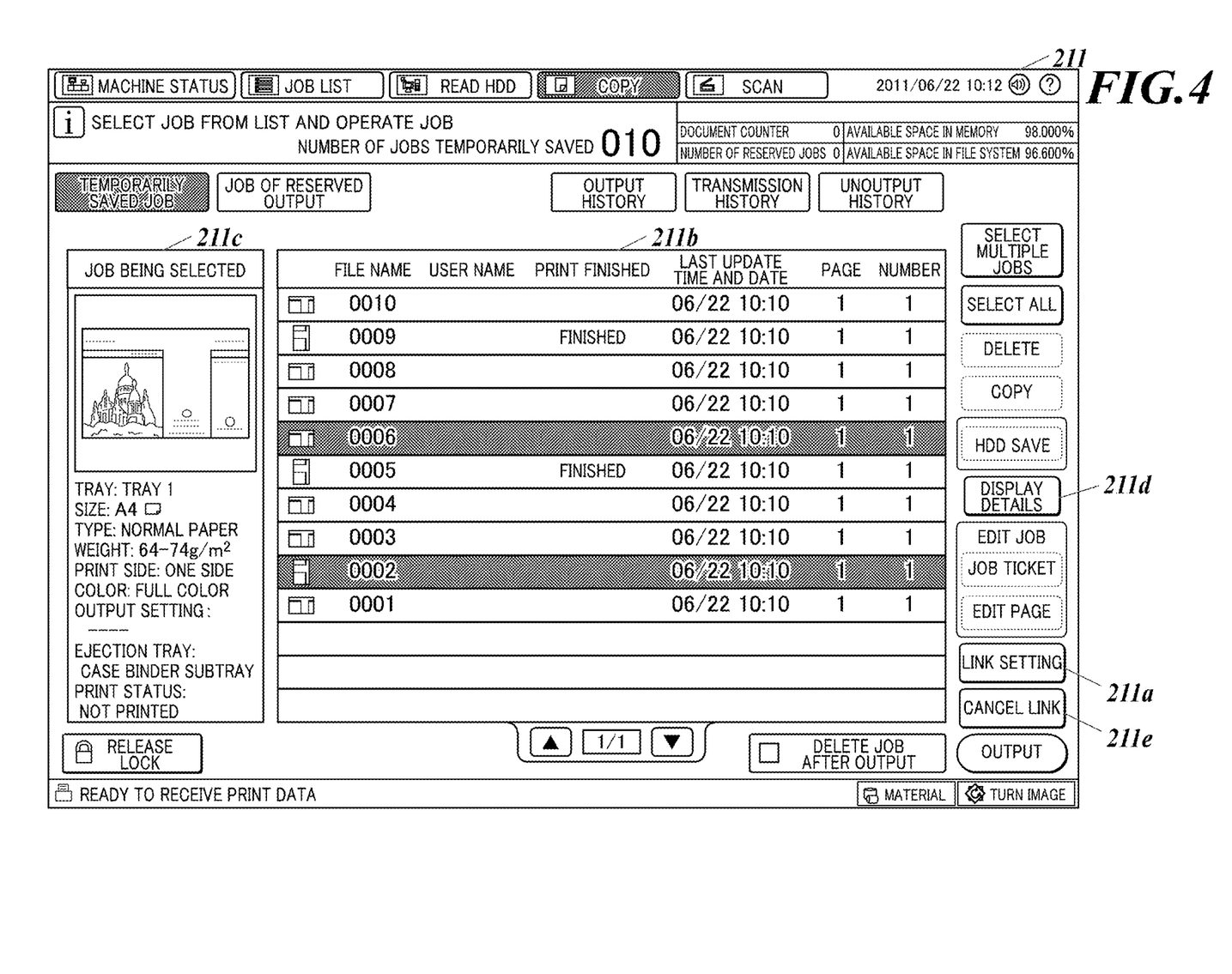
FIG. 4 shows an example of a job list screen.

FIG. 4 shows an example of the job list screen 211. The job list screen 211 is a screen for setting a link between displayed jobs. As shown in FIG. 4, the job list screen 211 includes a link setting button 211a, a job list column 211b, a selected job detail column 211c, a detail display button 211d, and a link cancel button 211e.

The link setting button 211a is a button for ordering a link setting between displayed jobs. Setting a link means associating jobs with each other while keeping each of the jobs independent.

The job list column 211b is an area where a list of jobs is displayed. The selected job detail column 211c is an area where detailed information of a job selected from the job list column 211b is displayed. The detail display button 211d is a button for ordering display of details of a selected job. The link cancel button 211e is a button for performing the link cancel processing on a job for which the link setting should be canceled.

Next, the controller 100 determines whether two jobs displayed by the operation interface 22 are selected on the job list screen 211 (Step S2). One of the two jobs is a sketch job, and the other is an additional print job. In a case where the controller 100 determines that two jobs are not selected (NO in Step S2), the controller 100 returns processing to Step S1.

In a case where the controller 100 determines that two jobs are selected (YES in Step S2), the controller 100 determines whether the link setting button 211a is operated by the operation interface 22 (Step S3). In a case where the controller 100 determines that the link setting button 211a is not operated (NO in Step S3), the controller 100 returns processing to Step S1.

In a case where the controller 100 determines that the link setting button 211a is operated (YES in Step S3), the controller 100 performs the link setting for the selected jobs (Step S4). At this time, the controller 100 performs the association setting of associating some items common the two jobs, and adds additional items of the associated items to the additional print job. The item to be associated is an original item in relation to the additional item.

The controller 100 then enters a value of the sketch job as an original item value of the additional print job (Step S5).

The controller 100 accepts a value entered from user operation via the operation interface 22 as an additional item value of the additional print job (Step S6).

The controller 100 sets the additional item value of the additional print job to the value entered in Step S6 (Step S7), and ends the processing.

The memory 70 stores information of the link setting, the association setting, and the additional item setting. Items to be associated are pre-set.

Items to be associated may be set manually by a user, or may be automatically set by a program according to purposes. Users are free to change items on which the association setting has been performed. For example, items to be associated are image shift and/or magnification.

To set a link between two jobs displayed on the job list screen 211, a user specifies via the operation interface 22 which of the two jobs is the sketch job or the additional print job. The controller 100 functions as a distinction unit.

To set a link between two jobs, the controller 100 may automatically set a job for which "additional print paper" is used to the additional print job. In a case where an additional print mode is set by user operation, the controller 100 may automatically set a created or edited job to the additional print job. The controller 100 functions as a mode setter.

Figure 5:
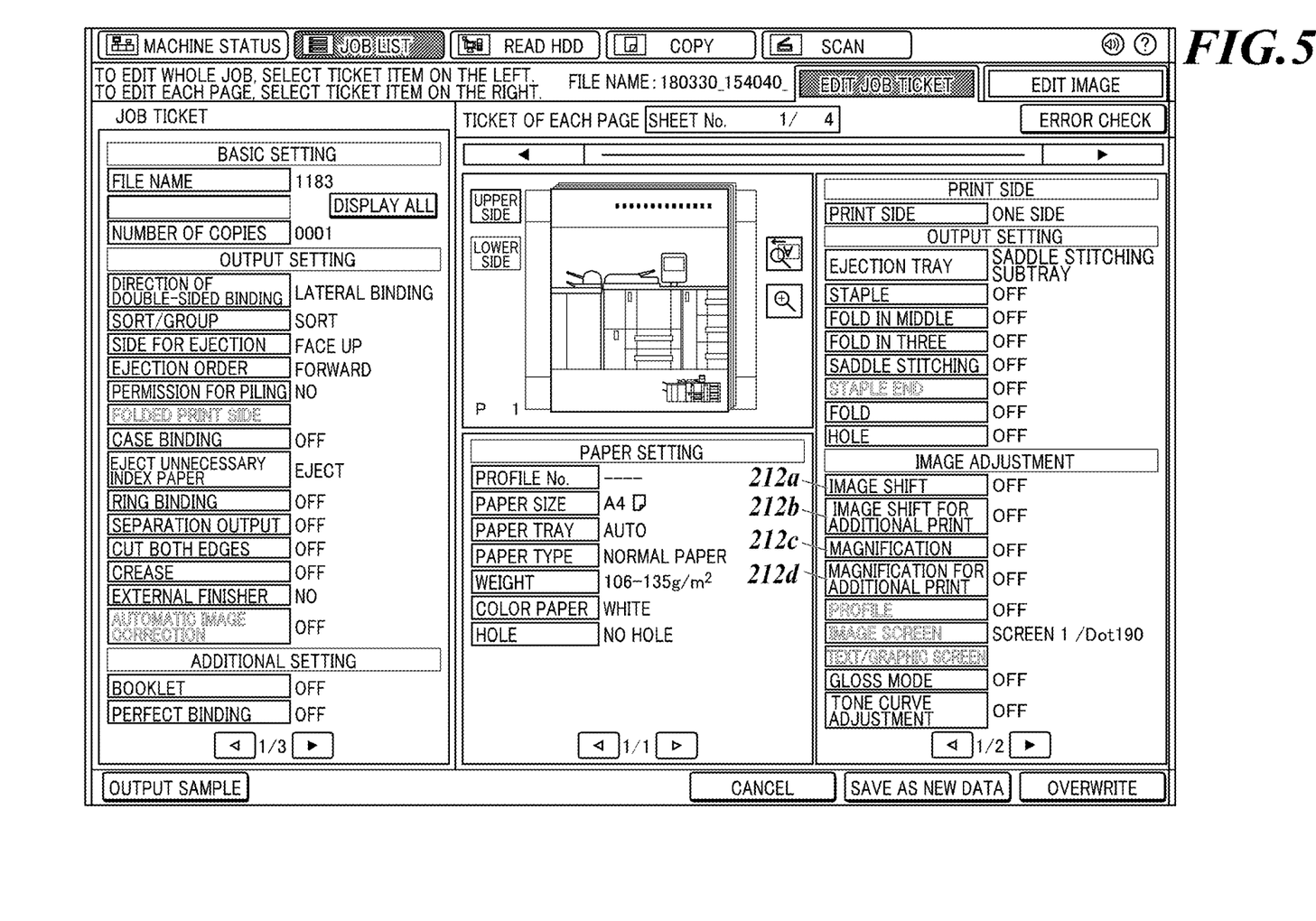
FIG. 5 shows a job information edit screen in which an additional item for an additional print job is added.

In FIG. 5, additional items for the additional print job is added.

An image shift item 212a is an original item of image shift of the additional print job. An additional print image shift item 212b is added as an additional item of image shift. A value is entered in the additional print image shift item 212b by user operation.

A magnification item 212c is an original item of magnification of the additional print job. An additional print magnification item 212d is added as an additional item of magnification. A value is entered in the additional print magnification item 212d by user operation.

Link Cancel Processing for Jobs

Figure 6:
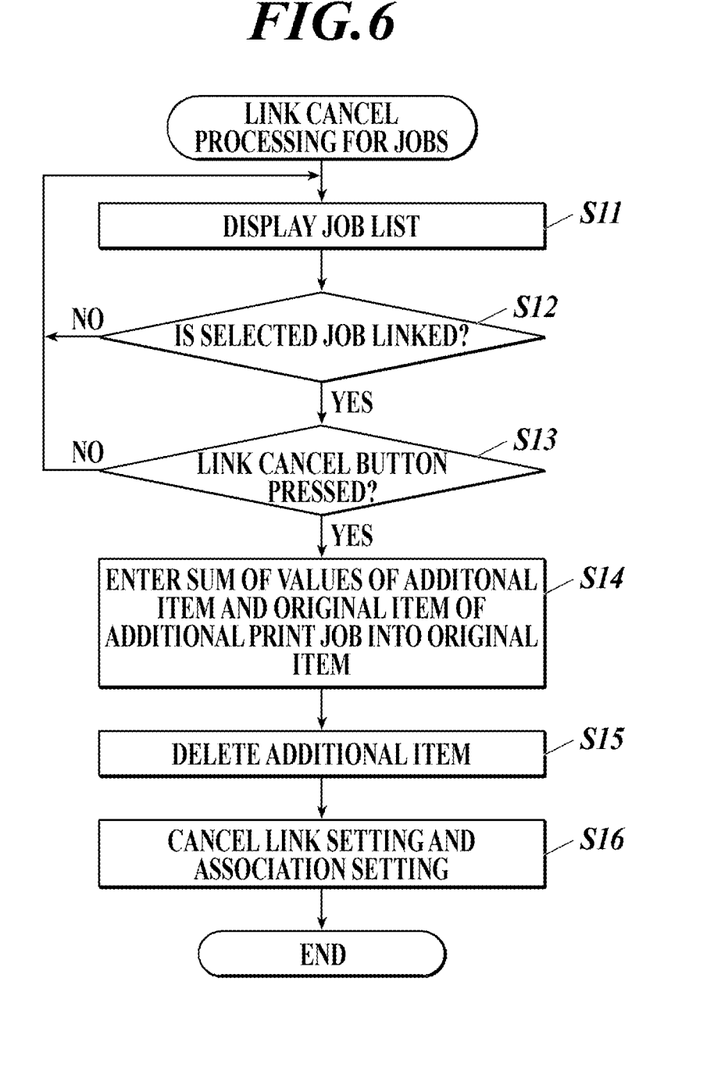
FIG. 6 is a flowchart showing link cancel processing for jobs.

FIG. 6 is a flowchart showing the link cancel processing for jobs which is performed by the image forming device 1. The controller 100 cooperates with a program stored in the ROM 102 to perform the processing in response to operation on the operation interface 22.

First, the controller 100 displays the job list screen 211 on the display 21 (Step S11). Next, the controller 100 determines whether the link setting is performed for a job which is displayed on the job list screen 211 and which is selected by the operation interface 22 (Step S12). In a case where the controller 100 determines that the link setting is not performed (NO in Step S12), the controller 100 returns processing to Step S11.

In a case where the controller 100 determines that the link setting is performed (YES in Step S12), the controller 100 then determines whether the link cancel button 211e is operated in the operation interface 22 (Step S13). Ina case where the controller 100 determines that the link cancel button is not operated (NO in Step S13), the controller 100 returns processing to Step S11.

In a case where the controller 100 determines that the link cancel button is operated (YES in Step S13), the controller 100 enters the sum of values of the additional item and the associated item (original item) into the associated item (original item) of the additional print job (Step S14).

The controller 100 then deletes the additional item in the additional print job (Step S15). The controller 100 cancels the link setting and the association setting of the sketch job and the additional print job (Step S16), and ends processing.

As described above, the controller 100 of the image forming device 1 associates jobs with each other while keeping each of the jobs independent.

The controller 100 performs predetermined operation control based on:
link information that indicates association of jobs;
association information that associates some common items with each other; and
additional item information that sets addition of items to be associated.

Values corresponding to items of the sketch job are entered in items of the additional print job which are associated with the sketch job. Values, such as an amount of paper shrinking due to fusing heat, are entered into additional items. This facilitates adjustment of item values of the additional print job for which a link with the sketch job is set.

The embodiment shows a preferable example of an image forming device according to the present invention. The present invention is not limited thereto.

Although the image processing device is provided with the image former in the embodiment, the present invention is not limited thereto. The image processing device may be separate from the image former.

Although the number of jobs to be linked is two in the embodiment, the present invention is not limited thereto. More than two jobs may be linked.

Details of configuration and operation of the image forming device 1 may be appropriately modified within the scope of the claims of the present invention.

Although embodiments of the present invention have been described and illustrated in detail, the disclosed embodiments are made for purposes of illustration and example only and not limitation. The scope of the present invention should be interpreted by terms of the appended claims.

The entire disclosure of Japanese patent application No. 2020-081662, filed on May 7, 2020, is incorporated herein by reference in its entirety.

What is claimed is:

1. An image processing device, comprising:
a job entry unit that enters a plurality of print jobs;
a link setter that associates the plurality of print jobs using same sheets entered by the job entry unit, the plurality of print jobs having a sketch job and an additional print job;
an association setter that associates one or more items common to the associated the plurality of print jobs;
an additional item setter that adds, after the association setter associates the one or more common items, an additional item to one of the plurality of print jobs, wherein the one or more common items are original items in relation to the additional item, and wherein the additional item is for entering correction item information for correcting item information of a predetermined item among the one or more common items associated by the association setter; and
a controller that performs the plurality of print jobs based on: item information of the one or more common items associated by the association setter, and additional item information of the additional item added by the additional item setter.

2. The image processing device according to claim 1, wherein the predetermined item includes at least one of image shift adjustment and magnification adjustment.

3. The image processing device according to claim 1, wherein the link setter associates two jobs, a first job of which being a sketch job, as the item information of the predetermined item of the two jobs, the association setter enters a first value which is a value of the sketch job, and as the additional item information of the additional item of a second job of the two jobs, the association setter enters a second value which is a value entered by user operation.

4. The image processing device according to claim 3, wherein, when the association setter cancels association of the two jobs, the association setter enters a value obtained by correcting the first value using the second value as the item information of the predetermined item of the second job.

5. The image processing device according to claim 1, wherein the image processing device further comprises a distinction unit that identifies which is the sketch job or the additional print job based on user operation when the link setter associates the two jobs.

6. The image processing device according to claim 5, wherein, to associate the two jobs, the link setter automatically sets one of the two jobs to the additional print job.

7. The image processing device according to claim 5, further comprising:
   a mode setter that sets an additional print mode to perform the additional print job,
   wherein the link setter automatically sets a created or edited job to the additional print job.

8. An image forming device, comprising: the image processing device according to claim 1; and an image former that forms images on paper.

9. A non-transitory recording medium storing a computer readable program that makes a computer of an image processing device function as:
   a job entry unit that enters a plurality of print jobs;
   a link setter that associates the plurality of print jobs using the same sheets entered by the job entry unit, the plurality of print jobs having a sketch job and an additional print job;
   an association setter that associates one or more items common to the associated the plurality of print jobs;
   an additional item setter that adds, after the association setter associates the one or more common items, an additional item to one of the plurality of print jobs, wherein the one or more common items are original items in relation to the additional item; and wherein the additional item being for entering correction item information for correcting item information of a predetermined item among the one or more items associated by the association setter; and
   a controller that performs the plurality of print jobs based on: item information of the one or more items associated by the association setter, and additional item information of the additional item added by the additional item setter.

10. An image processing device, comprising:
   a job entry unit that enters a plurality of jobs;
   a link setter that associates two jobs of the plurality of jobs entered by the job entry unit, a first job being a sketch job;
   an association setter that associates one or more items common to the associated two jobs;
   an additional item setter that adds an additional item to one of the jobs, the additional item being for entering correction item information for correcting item information of a predetermined item among the one or more items associated by the association setter, wherein (i) as the item information of the predetermined item of the two jobs, the association setter enters a first value which is a value of the sketch job, and (ii) as the additional item of a second job of the two jobs, the association setter enters a second value which is a value entered by user operation; and
   a controller that performs the jobs based on: item information of the one or more items associated by the association setter, and additional item information of the additional item added by the additional item setter,
   wherein when the association setter cancels association of the two jobs, the association setter enters a value obtained by correcting the first value using the second value as the item information of the predetermined item of the second job.

* * * * *